US012736613B2

(12) United States Patent
Kwon et al.

(10) Patent No.: US 12,736,613 B2
(45) Date of Patent: Sep. 15, 2026

(54) ROOF COVER FOR MOUNTING AUTONOMOUS DRIVING SENSOR

(71) Applicants: Hyundai Motor Company, Seoul (KR); Kia Corporation, Seoul (KR)

(72) Inventors: Woo Jae Kwon, Suwon-si (KR); Dong Ju Kim, Incheon (KR); Ji Eun Yang, Wonju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 260 days.

(21) Appl. No.: 18/535,358

(22) Filed: Dec. 11, 2023

(65) Prior Publication Data

US 2025/0102618 A1 Mar. 27, 2025

(30) Foreign Application Priority Data

Sep. 27, 2023 (KR) ........................ 10-2023-0129973

(51) Int. Cl.

*G01S 7/02* (2006.01)
*G01S 7/481* (2006.01)
*G01S 13/86* (2006.01)

(52) U.S. Cl.

CPC ............ *G01S 7/027* (2021.05); *G01S 7/4813* (2013.01); *G01S 13/865* (2013.01); *G01S 13/867* (2013.01)

(58) Field of Classification Search

CPC ...... G01S 7/027; G01S 7/4813; G01S 13/865; G01S 13/867

See application file for complete search history.

(56) References Cited

U.S. PATENT DOCUMENTS

| | | | | |
|---|---|---|---|---|
| 12,037,022 | B2 * | 7/2024 | Anderson | B60R 11/04 |
| 2021/0178983 | A1 * | 6/2021 | Daly, Jr. | G01S 17/86 |
| 2021/0364631 | A1 * | 11/2021 | Hasegawa | G01S 13/86 |
| 2023/0257022 | A1 * | 8/2023 | Lehotsky | B62D 25/06 296/210 |
| 2024/0326713 | A1 * | 10/2024 | Kuvelker | B60R 11/04 |
| 2025/0093470 | A1 * | 3/2025 | Rupp | G01S 17/931 |

FOREIGN PATENT DOCUMENTS

| | | |
|---|---|---|
| KR | 20210085734 A | 7/2021 |

* cited by examiner

*Primary Examiner* — Nazra Nur Waheed
(74) *Attorney, Agent, or Firm* — Slater Matsil, LLP

(57) ABSTRACT

An embodiment roof cover for mounting an autonomous driving sensor includes a base cover portion mountable to a vehicle roof, the base cover portion being divided into a plurality of mounting regions, a first cover portion coupled to the mounting regions such that mounting positions of a radio detection and ranging (RADAR) sensor module and a first camera module are fixable to a front surface of the vehicle roof, and a second cover portion coupled to the first cover portion such that mounting positions of a light detection and ranging (LIDAR) sensor module and an antenna module are fixable to an upper surface of the vehicle roof.

20 Claims, 9 Drawing Sheets

ROOF COVER FOR MOUNTING AUTONOMOUS DRIVING SENSOR

CROSS-REFERENCE TO RELATED APPLICATIONS

This application claims the benefit of Korean Patent Application No. 10-2023-0129973, filed on Sep. 27, 2023, which application is hereby incorporated herein by reference.

TECHNICAL FIELD

The present disclosure relates to a roof cover for mounting an autonomous driving sensor.

BACKGROUND

Usually, for autonomous driving, various operations required during vehicle driving are automatically performed. As an example, an autonomous driving vehicle can drive by itself on a road without the driver manually operating the steering wheel, the acceleration pedal, the brake pedal, and the like.

For autonomous driving, cameras and various sensors, such as a radio detection and ranging (RADAR) sensor, a light detection and ranging (LIDAR) sensor, and an ultrasonic sensor, are required to recognize a surrounding environment, including the terrain of the vehicle and its position. With these cameras and sensors, functions are automatically performed such as driving lane keeping, adaptive cruise control, nearby obstacle detection, and collision avoidance.

For autonomous driving, these cameras and sensors, such as the RADAR sensor, the LIDAR sensor, and the ultrasonic sensor, serve the purpose of removing blind spots. They are typically also positioned on the front and rear of the vehicle, its roof, and its edges.

Accordingly, there is a need to mount various sensors to the front and rear of the autonomous driving vehicle. These various sensors are required to be mounted to a structure employed for a vehicle body. Alternatively, a separate protruding-type external component for fixing them is required to be mounted to the vehicle body.

Particularly, when a sensor for autonomous driving is mounted to a vehicle fender or roof, it extends more protrusively from the lateral and upper surfaces of the vehicle than in its original shape. In recreational vehicles (RVs) or three door-type vehicles, the front seats have a walk-in function to assist rear passengers in entering and exiting the vehicle.

SUMMARY

The present disclosure relates to a roof cover for mounting an autonomous driving sensor. Particular embodiments relate to a roof cover for mounting an autonomous driving sensor, the roof cover facilitating assembling of a camera, a LIDAR sensor, and a RADAR sensor, which are modularized, to a vehicle roof, thereby improving the ease of assembly and the aesthetic exterior appearance of a vehicle body.

An embodiment of the present disclosure provides a roof cover for mounting an autonomous driving sensor, the roof cover facilitating assembling of a camera, a LIDAR sensor, and a RADAR sensor for autonomous driving, which are manufactured in a modularized manner, and mounting of them to required positions on a vehicle roof, thereby improving the ease of assembly and the aesthetic exterior appearance of a vehicle body.

According to an embodiment of the present disclosure, there is provided a roof cover for mounting an autonomous driving sensor, the roof cover including a base cover portion mounted to a vehicle roof, the base cover portion being divided into a plurality of mounting regions, a first cover portion formed to be coupled to the mounting region in such a manner that mounting positions of a RADAR sensor module and a first camera module are fixed to a front surface of the vehicle roof, and a second cover portion formed to be coupled to the first cover portion in such a manner that mounting positions of a LIDAR sensor module and an antenna module are fixed to an upper surface of the vehicle roof.

In the roof cover, the first cover portion may include a mounting bracket formed in such a manner as to be mounted in an upright position to the mounting region and thus cover a widthwise direction of the mounting region and in such a manner that the RADAR sensor module and the first camera module are mounted, a first cover member formed in such a manner as to cover, on a front surface of the mounting bracket, a first detection region to which a plurality of the first camera modules are mounted, and a second member formed in such a manner as to cover, on the front surface of the mounting bracket, a second detection region to which a plurality of the RADAR sensor modules are mounted.

In the roof cover, the mounting bracket may include a plurality of fastening holes formed in such a manner as to be aligned with coupling holes, respectively, in the RADAR sensor module and a plurality of hook coupling holes formed in such a manner to be positioned so that hook members on the RADAR sensor module are engaged therein, respectively, and the RADAR sensor module may be arranged on the front surface of the mounting bracket.

In the roof cover, the mounting bracket may include a plurality of guide pins formed in such a manner that a mounting bracket of the first camera module is placed and a plurality of fastening holes formed in such a manner that the mounting bracket is fastened, and the first camera module may be arranged on a rear surface of the mounting bracket.

In the roof cover, the first cover member may be formed in a manner that is divided into a pair of sub-portion members having the same shape, so that, on the front surface of the mounting bracket, the pair of sub-portion members covers the first detection region except for a plurality of cameras exposed to the outside.

In the roof cover, the first cover member may include a plurality of hook members formed in such a manner as to be fixedly positioned to be hooked into the front surface of the mounting bracket by being inserted thereinto.

In the roof cover, the first cover member may form a stepped structure together with the other side of the second cover portion and may be coupled to the front surface of the mounting bracket.

In the roof cover, the second cover member may be formed in a manner that is divided into a pair of sub-portion members having the same shape, so that, on the front surface of the mounting bracket, the pair of sub-portion members covers the second detection region except for the RADAR sensor module exposed to the outside.

In the roof cover, the second cover member may include a plurality of clip members formed in such a manner as to be fixedly positioned to be hooked into the front surface of the mounting bracket by being inserted thereinto.

In the roof cover, the second cover member may form a stepped structure together with the other side of the second cover portion and may be coupled to the front surface of the mounting bracket.

In the roof cover, the second cover portion may include a mounting guide formed in such a manner that the antenna module is mounted, a first coupling cover member having a mounting hole through the center of which the LIDAR sensor module, coupled to the first cover portion and mounted by a bracket, passes for protrusion therefrom, and a second coupling cover member formed to shield an upper surface of the vehicle roof between the mounting guide and the first coupling cover member.

In the roof cover, the first coupling cover member may include a plurality of fastening holes for coupling to the first cover portion and a cap member formed in such a manner that the cap member has the same height as the first coupling cover member and shields the inside of the fastening hole when a fastening member is insertion-fastened into the fastening hole by passing through the center thereof.

The roof cover may further include third cover portions formed in such a manner as to be mounted on both sides, respectively, of the base cover portion, thereby fixing a mounting position of the second camera module to a lateral surface of the vehicle roof.

In the roof cover, each of the third cover portions may include a main body formed in such a manner that a mounting bracket of the second camera module is placed thereinside and a fixation member formed in such a manner to be coupled to the vehicle roof, thereby fixing a position of the main body.

According to embodiments of the present disclosure, the camera, the LIDAR sensor, and the RADAR sensor for autonomous driving are manufactured in a modularized manner for mounting to the vehicle roof. These modularized components are assembled and mounted to required positions, respectively, on the vehicle roof. Consequently, embodiments of the present disclosure provide the advantageous effect of improving the ease of assembly and the aesthetic exterior appearance of the vehicle body.

Moreover, according to embodiments of the present disclosure, the modularized component is mounted to the mounting bracket of the roof. Then, with assembling of a cover, the modularized component is prevented from being exposed to the outside. The modularized component is reliably fixed by fastening the cover to the mounting bracket. Consequently, embodiments of the present disclosure provide the advantageous effect of preventing problems such as low quality, noise, and deformation.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the embodiments of the present disclosure, and wherein.

DETAILED DESCRIPTION OF ILLUSTRATIVE EMBODIMENTS

Embodiments of the present disclosure will be described in more detail below with reference to the accompanying drawings. The embodiments of the present disclosure may be modified in various forms, and the scope of the present disclosure should not be interpreted as being limited to the following embodiments. The embodiments are described in sufficient detail to enable a person of ordinary skill in the art to make and use the present disclosure.

Preferred embodiments of the present disclosure will be described in detail below with reference to the accompanying drawings.

An advantage of embodiments of the present disclosure, a feature thereof, and a method of achieving the advantage and the feature will be apparent from the embodiments that will be described below in detail with reference to the accompanying drawings.

However, the embodiments of the present disclosure are not limited to the embodiments that will be disclosed below and will be practiced in various different forms. The embodiments are only provided to make a complete disclosure of the present disclosure and to provide a person of ordinary skill in the art to which the present disclosure pertains with definite notice as to the scope of the present disclosure. The scope of the present disclosure should be only defined in the claims.

In addition, a detailed description of a well-known technology or the like related to embodiments of the present disclosure, when determined as making the gist and nature of the embodiments of the present disclosure obfuscated, will be omitted.

Figure 1:
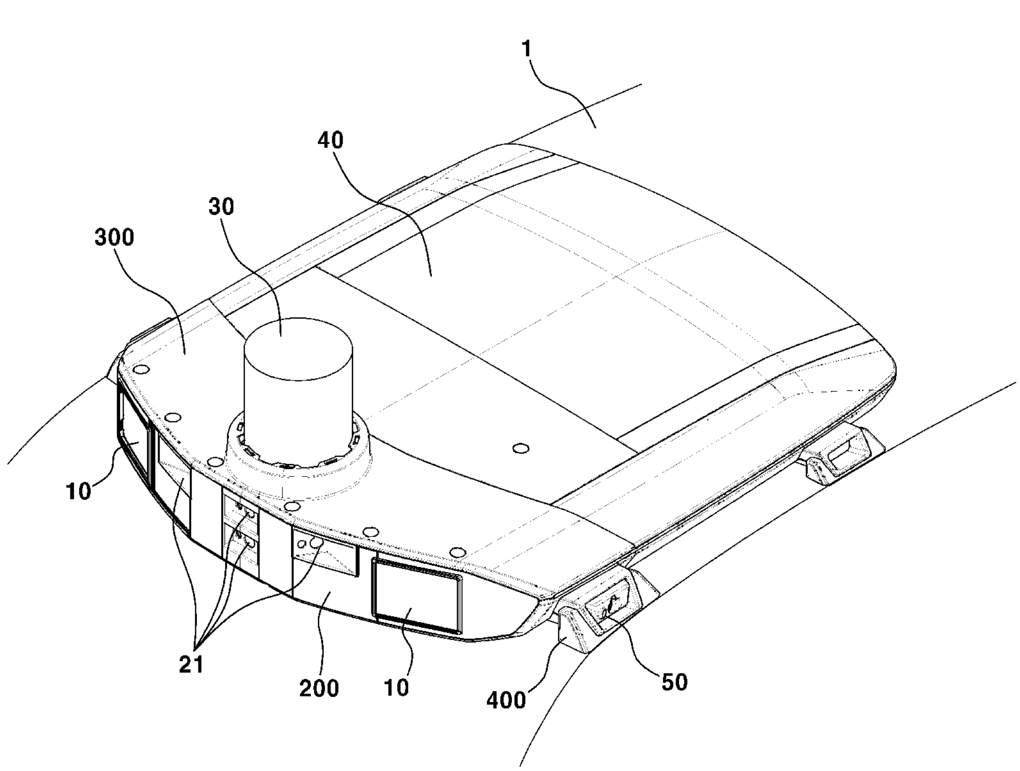
FIG. 1 is a view illustrating a state where a roof cover for mounting an autonomous driving sensor according to an embodiment of the present disclosure is assembled.
Figure 2:
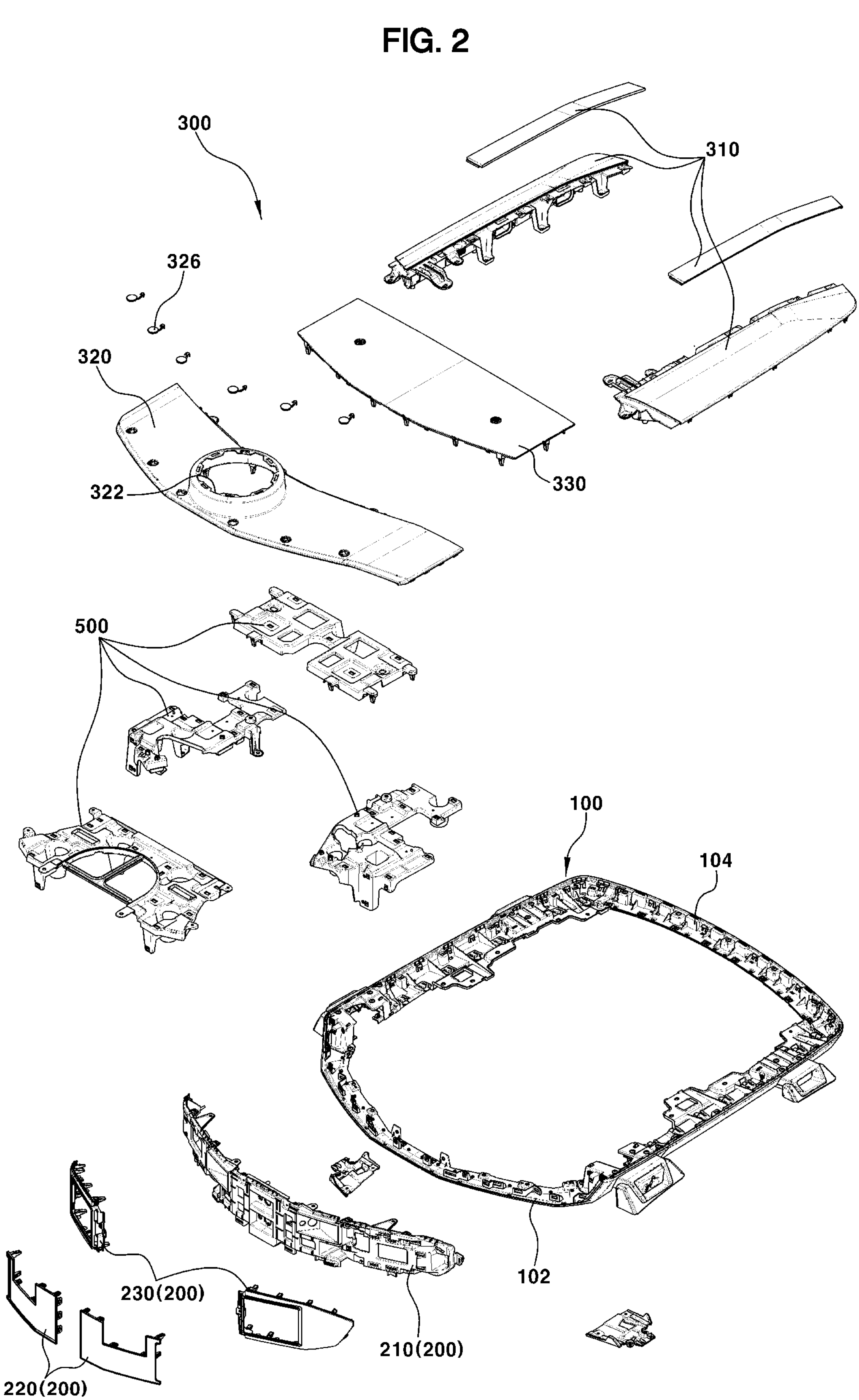
FIG. 2 is a view illustrating a state where the roof cover for mounting the autonomous driving sensor according to an embodiment of the present disclosure is disassembled.
Figure 3:
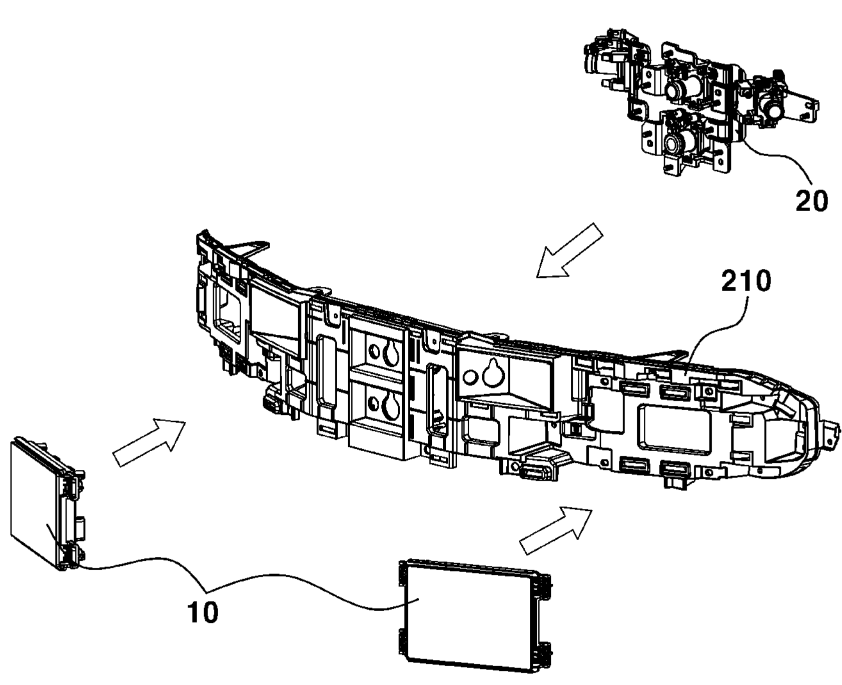
FIGS. 3 to 5 are views each illustrating a mounting bracket of a first cover portion of the roof cover for mounting the autonomous driving sensor according to an embodiment of the present disclosure.
Figure 4:
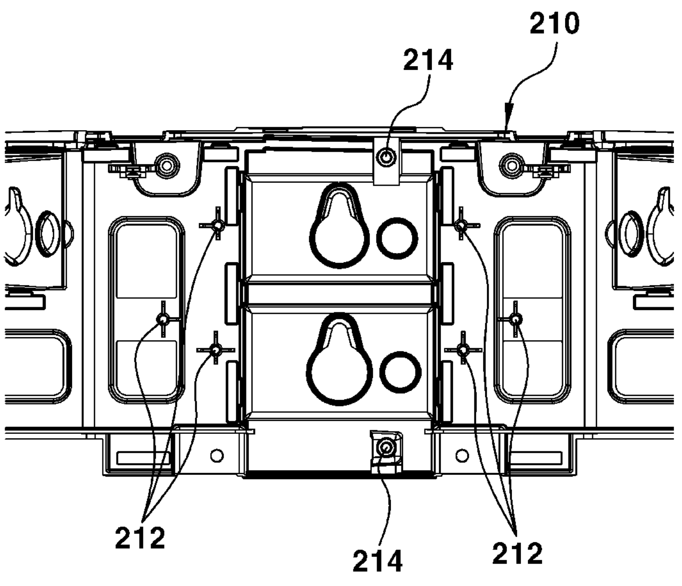
Figure 5:
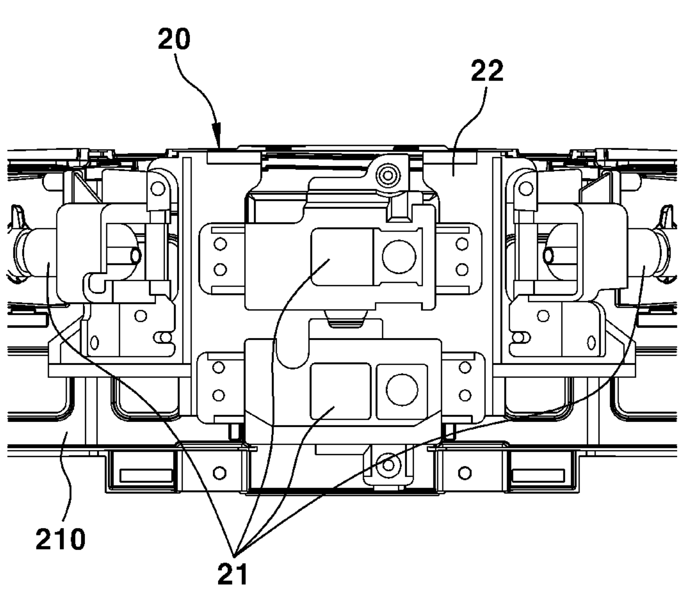

FIG. 1 is a view illustrating a state where a roof cover for mounting an autonomous driving sensor according to an embodiment of the present disclosure is assembled. FIG. 2 is a view illustrating a state where the roof cover for mounting the autonomous driving sensor according to an embodiment of the present disclosure is disassembled. FIGS. 3 to 5 are views each illustrating a mounting bracket of a first cover portion of the roof cover for mounting the autonomous driving sensor according to an embodiment of the present disclosure.

Figure 6:
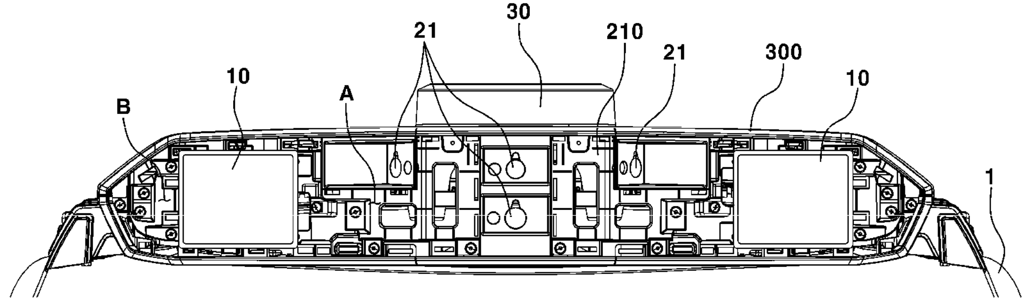
FIG. 6 and FIGS. 7A to 7C are views each illustrating a first cover member and a second cover member of the roof cover for mounting the autonomous driving sensor according to an embodiment of the present disclosure.
Figure 7A:
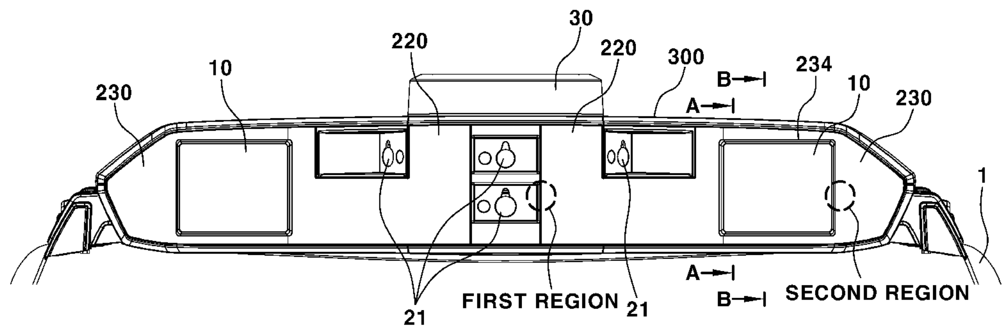
Figure 8:
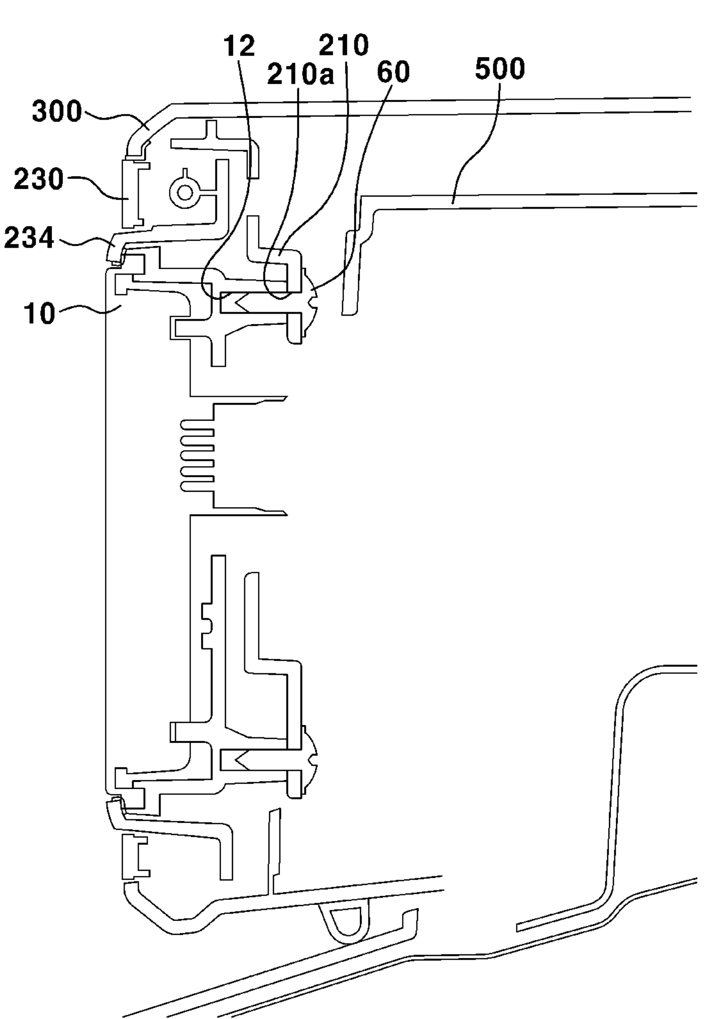
FIG. 8 is a cross-sectional view taken along line A-A of FIG. 7A, illustrating that a RADAR sensor module is coupled to the roof cover for mounting the autonomous driving sensor according to an embodiment of the present disclosure.
Figure 9:
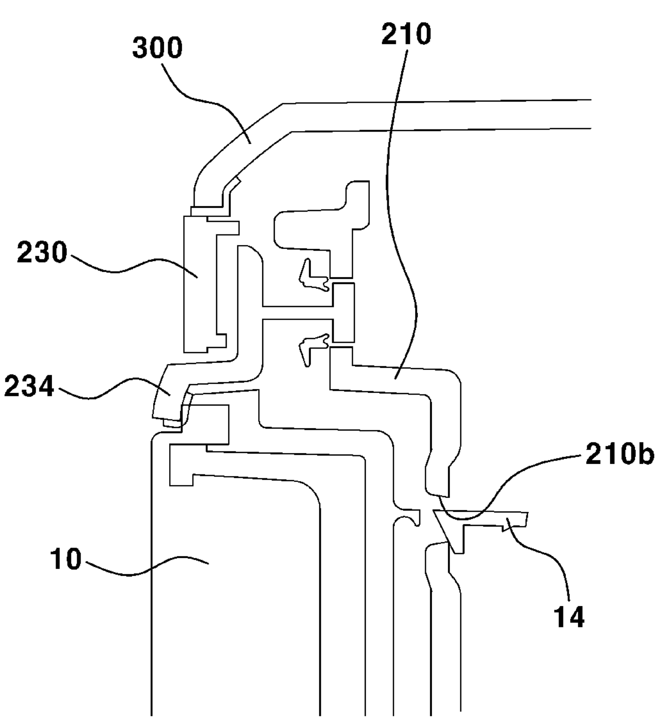
FIG. 9 is a cross-sectional view taken along line B-B of FIG. 7A, illustrating that the RADAR sensor module is coupled to the roof cover for mounting the autonomous driving sensor according to an embodiment of the present disclosure.
Figure 10:
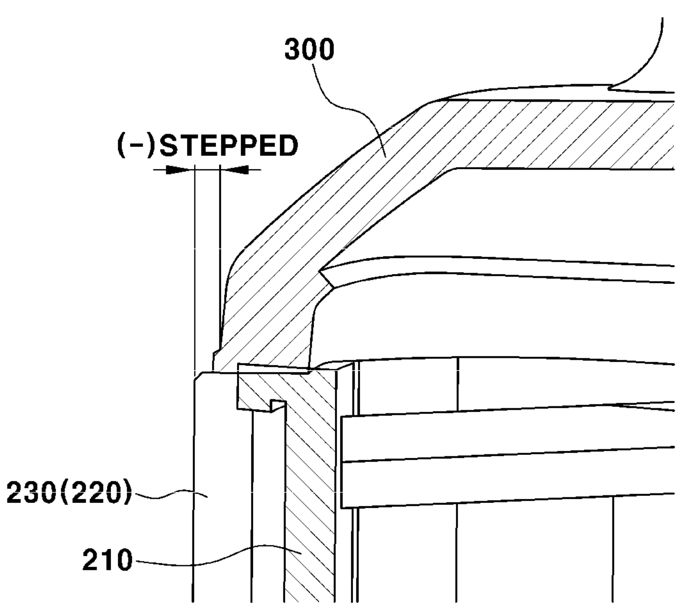
FIG. 10 is a view illustrating the second cover member of the roof cover for mounting the autonomous driving sensor according to an embodiment of the present disclosure.
Figure 11:
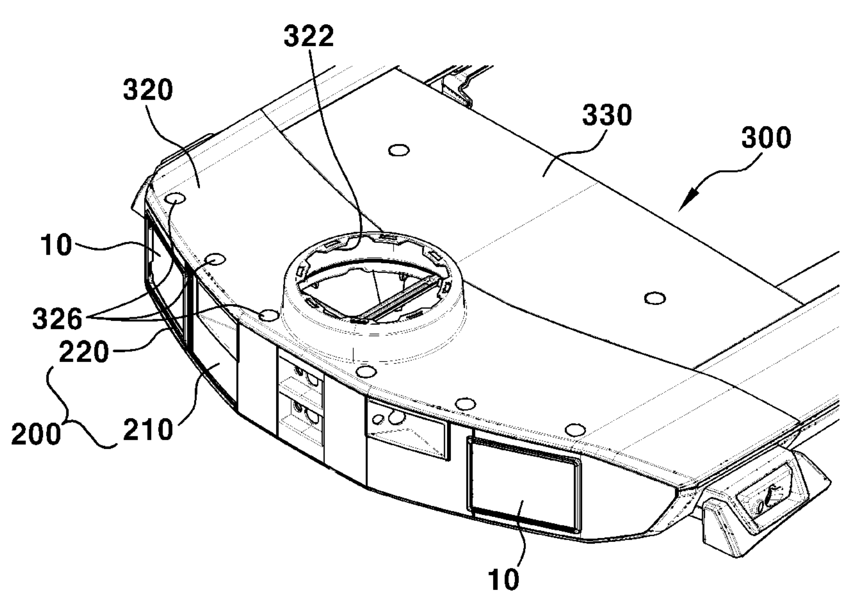
FIG. 11 is a view illustrating a second cover portion of the roof cover for mounting the autonomous driving sensor according to an embodiment of the present disclosure.

FIG. 6 and FIGS. 7A to 7C are views each illustrating a first cover member and a second cover member of the roof cover for mounting the autonomous driving sensor according to an embodiment of the present disclosure. FIG. 8 is a cross-sectional view taken along line A-A of FIG. 7A, illustrating that a radio detection and ranging (RADAR) sensor module is coupled to the roof cover for mounting the autonomous driving sensor according to an embodiment of the present disclosure. FIG. 9 is a cross-sectional view taken along line B-B of FIG. 7A, illustrating that the RADAR sensor module is coupled to the roof cover for mounting the autonomous driving sensor according to an embodiment of the present disclosure. FIG. 10 is a view illustrating the second cover member of the roof cover for mounting the autonomous driving sensor according to an embodiment of the present disclosure. FIG. 11 is a view illustrating a second cover portion of the roof cover for mounting the autonomous driving sensor according to an embodiment of the present disclosure.

Figure 12:
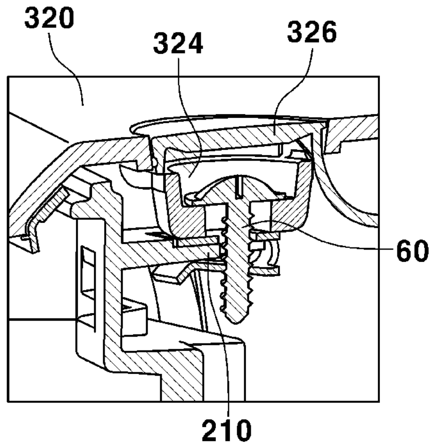
FIG. 12 is a view illustrating a cap member of the roof cover for mounting the autonomous driving sensor according to an embodiment of the present disclosure.
Figure 13:
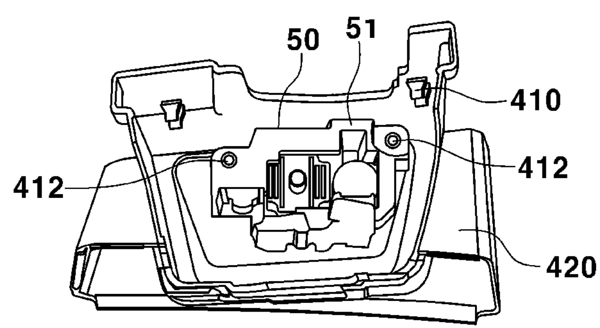
FIG. 13 is a vertical cross-sectional view illustrating a third cover portion of the roof cover for mounting the autonomous driving sensor according to an embodiment of the present disclosure.
Figure 14:
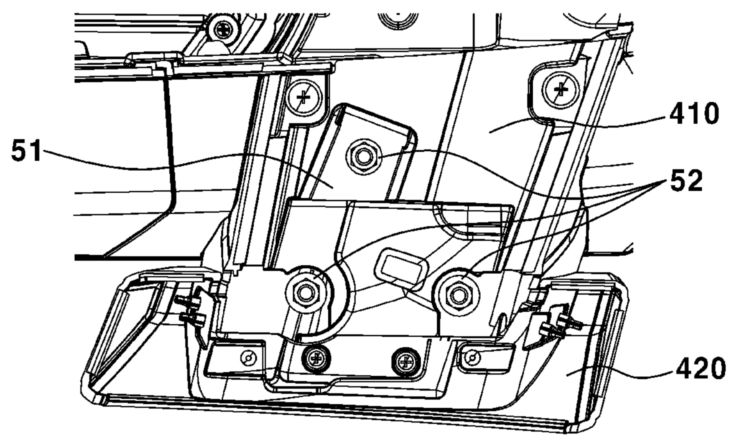
FIG. 14 is a lower cross-sectional view illustrating a third cover portion of the roof cover for mounting the autonomous driving sensor according to an embodiment of the present disclosure.

FIG. 12 is a view illustrating a cap member of the roof cover for mounting the autonomous driving sensor according to an embodiment of the present disclosure. FIG. 13 is a vertical cross-sectional view illustrating a third cover portion of the roof cover for mounting the autonomous driving sensor according to an embodiment of the present disclosure. FIG. 14 is a lower cross-sectional view illustrating a third cover portion of the roof cover for mounting the autonomous driving sensor according to an embodiment of the present disclosure.

In a case where a light detection and ranging (LIDAR) sensor module 30, which is an autonomous driving sensor, is mounted in a structure of a vehicle roof 1, the LIDAR sensor module 30 with a predetermined height necessarily protrudes excessively to the outside due to its structural characteristic.

In a case where a plurality of other autonomous driving sensors, such as a RADAR sensor module 10, first and second camera modules 20 and 50, and an antenna module 40, are mounted, together with the sensor module 30, on the vehicle roof 1, they necessarily affect the aesthetic exterior appearance of a vehicle body in an adverse manner.

To this end, a separate external component formed of plastic material or the like, reflecting the aesthetic exterior appearance of the vehicle body, may be newly mounted. However, processes such as drilling a hole to mount this external component are required, and thus, the aesthetic exterior appearance of the vehicle roof 1 is necessarily affected in an adverse manner.

In order to address this problem, as illustrated in FIGS. 1 and 2, the roof cover for mounting the autonomous driving sensor according to the present embodiment may include a base cover portion 100, a first cover portion 200, and a second cover portion 300 that have respective independent structures for mounting and fixing all of the RADAR sensor module 10, the first and second camera modules 20 and 50, the LIDAR sensor module 30, and the antenna module 40.

The base cover portion 100, which is divided into a plurality of mounting regions, is mounted to the vehicle roof 1.

More preferably, the base cover portion 100 may be divided into a front region 102 for directly/indirectly mounting the RADAR sensor module 10, the first camera module 20, and the LIDAR sensor module 30 and a rear region 104 for mounting the antenna module 40.

The first cover portion 200 is formed in such a manner that the first cover portion 200 is coupled to the front region 102 and thus respective mounting positions of the RADAR sensor module 10 and the first camera module 20 are fixed to a front surface of the vehicle roof 1.

The first cover portion 200, as illustrated in FIG. 2, includes a mounting bracket 210, the first cover member 220, and the second cover member 230.

The mounting bracket 210 is formed in such a manner as to be mounted in the upright position to the base cover portion 100, thereby covering a widthwise direction of the front region 102. Furthermore, as illustrated in FIG. 3, the mounting bracket 210 is formed in such a manner that the RADAR sensor module 10 and the first camera module 20 are mounted thereto.

That is, a pair of RADAR sensor modules 10 is mounted to a front surface of the mounting bracket 210, and one first camera module 20 is mounted to a rear surface thereof.

The mounting bracket 210 is arranged on the front surface of the RADAR sensor module 10. For this reason, the mounting bracket 210 includes a plurality of fastening holes 210*a* and a plurality of hook coupling holes 210*b*. The plurality of fastening holes 210*a*, as illustrated in FIG. 8, are formed in such a manner as to be aligned with coupling holes 12, respectively, formed in the RADAR sensor module 10. The plurality of hook coupling holes 210*b*, as illustrated in FIG. 9, are formed in such a manner as to be positioned so that hook members 14 provided on the RADAR sensor module 10 are engaged therein, respectively.

In other words, the plurality of coupling holes 12 are formed along an edge of an upper portion of a rear surface of the RADAR sensor module 10, and the hook members 14 are formed along an edge of a lower portion thereof. In this structure, the hook member 14 is first engaged in the hook coupling hole 210*b* (refer to FIG. 9), and then a fastening member 60 is fastened into the coupling hole 12 by passing through the fastening hole 210*a* (refer to FIG. 8). Thus, as illustrated in FIG. 6, the pair of RADAR sensor modules 10 can be reliably mounted to the mounting bracket 210.

The first camera module 20 is arranged on the rear surface of the mounting bracket 210. For this reason, as illustrated in FIGS. 4 and 5, the mounting bracket 210 includes a plurality of guide pins 212 and a plurality of fastening holes 214. The plurality of guide pins 212 are formed in such a manner that a mounting bracket 22 of the first camera module 20 is placed. The plurality of fastening holes 214 are formed in such a manner that the fastening members 60 are fastened thereinto, respectively, to fasten the mounting bracket 22.

More specifically, the mounting bracket 22 is placed on the plurality of guide pins 212 of the mounting bracket 210, thereby primarily fixing a position of the first camera module 20. In this state, the fastening member 60 passes through the mounting bracket 22 at a matched position and is finally fastened to the fastening hole 214. Consequently, a position of the first camera module 20 on the rear surface of the mounting bracket 210 is reliably fixed. Accordingly, positions of a plurality of cameras 21 that protrude at different angles from the mounting bracket 210 can be minimally changed.

The first cover member 220 is formed in such a manner as to cover, on the front surface of the mounting bracket 210, a first detection region A on which a plurality of first camera modules 20 are mounted.

More preferably, the first cover member 220, as illustrated in FIG. 7A, is formed in a manner that it is divided into a pair of sub-portion members having the same shape, so that, on the front surface of the mounting bracket 210, the pair of sub-portion members covers the first detection region A except for the plurality of cameras 21 exposed to the outside.

Figure 7B:
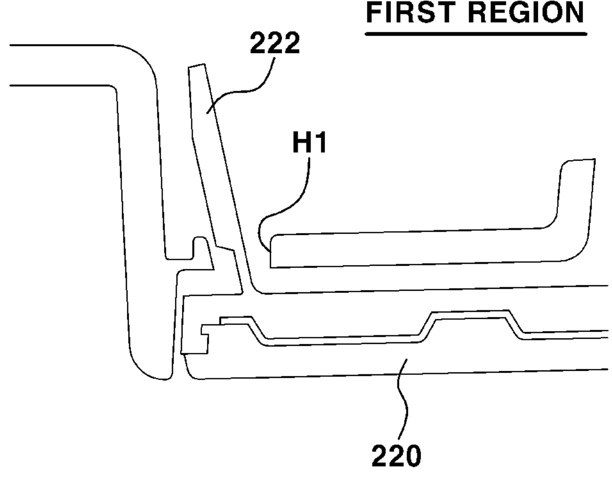

At this point, as in FIG. 7B illustrating a cross section of a first region of FIG. 7A, the first cover member 220 includes a plurality of hook members 222 that are fixedly positioned to be hooked into insertion grooves H1, respectively, in the front surface of the mounting bracket 210 by being inserted thereinto.

The hook member 222 is positioned to be hooked into the insertion groove H1 by being inserted thereinto in a state where one side of the first cover member 220 is fixed into the mounting bracket 210 by being inserted thereinto. Thus, the other side of the first cover member 220 can be fixed.

The first cover member 220, as illustrated in FIG. 10, forms a stepped structure together with the other side of the second cover portion 300 and is coupled to the front surface of the mounting bracket 210.

Since the first cover member 220 is positioned on the front surface of the mounting bracket 210 in the upright position, the first cover member 220 may be subject to direct wind resistance during vehicle driving, thereby causing quality problems such as damage. The reason for forming the stepped structure is to deal with this direct wind resistance. Wind can flow along a stepped surface.

In addition, the second cover member 230 is formed in such a manner as to cover, on the front surface of the mounting bracket 210, a second detection region B to which a plurality of RADAR sensor modules 10 are mounted.

More preferably, the second cover member 230, as illustrated in FIG. 7A, is formed in a manner that it is divided into a pair of sub-portion members having the same shape, so that, on the front surface of the mounting bracket 210, the pair of sub-portion members covers the second detection region B except for the RADAR sensor module 10 exposed to the outside.

Figure 7C:
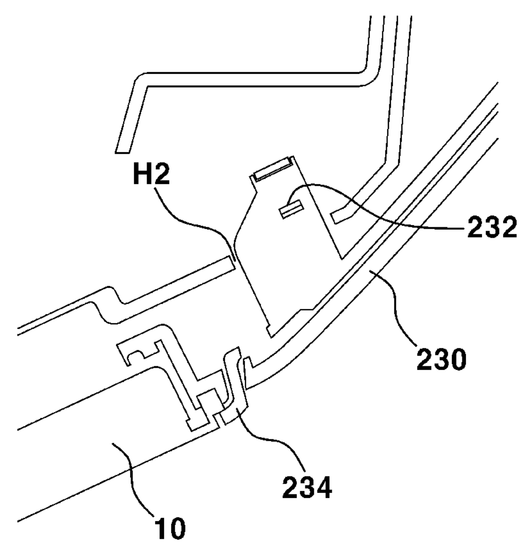

The second cover member 230 includes a support member 234 and a plurality of clip members 232. The support member 234 corresponds in size and shape to the RADAR sensor module 10. An edge of the support member 234 surrounds the RADAR sensor module 10. As in FIG. 7C illustrating a cross section of a second region of FIG. 7A, the plurality of clip members 232 are formed to be fixedly positioned in the front surface of the mounting bracket 210 by being forcefully inserted thereinto for coupling.

The plurality of clip members 232 may be insertion-coupled into insertion grooves H2, respectively, that correspond in position to the plurality of clip members 232, by being inserted thereinto. Thus, the second cover member 230 can be fixed.

The second cover member 230 forms a stepped structure together with the other side of the second cover portion 300 in the same manner as the first cover member 220 and is coupled to the front surface of the mounting bracket 210. With the stepped structure, wind is caused to flow along a stepped surface. Thus, quality problems such as damage due to wind can be prevented.

As illustrated in FIG. 11, the second cover portion 300 is formed in such a manner that it is coupled to the first cover portion 200, thereby fixing mounting positions of the LIDAR sensor module 30 and the antenna module 40 to an upper surface of the vehicle roof 1.

To this end, the second cover portion 300 includes a mounting guide 310, a first coupling cover member 320, and a second coupling cover member 330.

The mounting guide 310, as illustrated in FIGS. 1 and 2, is formed in such a manner that it supports a lateral surface of the antenna module 40 and is coupled to the base cover portion 100, thereby allowing for mounting of the antenna module 40.

The first coupling cover member 320 includes a mounting hole 322 (refer to FIG. 2). The LIDAR sensor module 30, which is coupled to the first cover portion 200, specifically, to the mounting bracket 210, and is supported by and mounted to a plurality of internal brackets 500, passes through the center of a mounting hole 322 for protrusion therefrom.

The first coupling cover member 320 includes a plurality of fastening holes 324 for coupling to the mounting bracket 210 and a cap member 326. The cap member 326 is formed in such a manner that, on an upper surface of the first coupling cover member 320, it shields the inside of the fastening hole 324. This shielding occurs when the fastening member 60 is insertion-fastened into the fastening hole 324 by passing through the center thereof.

The fastening member 60 passes through the center of the fastening hole 324 formed to be stepped and is fastened to the mounting bracket 210. Thereafter, the cap member 326 is mounted to the entrance to the stepped fastening hole 324. Thus, the fastening member 60 is prevented from being exposed to the outside, thereby preventing the first coupling cover member 320 from being removed or damaged.

Preferably, the cap member 326 is formed in such a manner as to have the same height as the stepped entrance to the fastening hole 324. Accordingly, the cap member 326 is formed in such a manner that an upper surface thereof is continuous with the upper surface of the first coupling cover member 320.

The roof cover for mounting the autonomous driving sensor according to the present embodiment, as illustrated in FIGS. 1 and 2, may further include a third cover portion 400.

Third cover portions 400 are formed in such a manner as to be mounted to both sides, respectively, of the base cover portion 100, thereby fixing a mounting position of the second camera module 50 to a lateral surface of the vehicle roof 1.

In other words, the second camera module 50 is configured to have the same function as the above-described first camera module 20. With the third cover portion 400, the second camera module 50 is fixed to the lateral surface of the vehicle roof 1. In this state, the second camera module 50 captures images of the surroundings on the lateral side of a vehicle.

The third cover portion 400 includes a main body 410 and a fixation member 420.

The main body 410, as illustrated in FIG. 13, is formed in such a manner that a mounting bracket 51 of the second camera module 50 is placed thereinside.

That is, in a state where, with a pair of placing members 412, the mounting bracket 51 is placed inside the main body 410, the second camera module 50, as illustrated in FIG. 14, is fixed to the vehicle roof 1 by being fastened thereto with three mounts 52. Consequently, with employment of this structure for placing and fastening, a position of the second camera module 50 can be minimally changed.

In addition, the fixation member 420 is formed in such a manner as to be coupled to the vehicle roof 1, thereby fixing a position of the main body 410.

Preferably, the fixation member 420 may be formed in the shape of "E", and thus may be fastened to the vehicle roof 1 while supporting both sides of the main body 410.

According to embodiments of the present disclosure, the camera, the LIDAR sensor, and the RADAR sensor for autonomous driving are manufactured in a modularized manner for mounting to the vehicle roof 1. These modularized components are assembled and mounted to required positions, respectively, on the vehicle roof 1. Consequently, embodiments of the present disclosure provide the advantageous effect of improving the ease of assembly and the aesthetic exterior appearance of the vehicle body.

Moreover, according to embodiments of the present disclosure, the modularized component is mounted to the mounting bracket of the roof. Then, with assembling of a cover, the modularized component is prevented from being exposed to the outside. The modularized component is reliably fixed by fastening the cover to the mounting bracket. Consequently, embodiments of the present disclosure provide the advantageous effect of preventing problems such as low quality, noise, and deformation.

The embodiments of the present disclosure are described above only in an exemplary manner with reference to the drawings. It would be understood by a person of ordinary skill in the art to which the present disclosure pertains that various modifications can be made to the embodiments and that some or all of the constituent elements of the embodiments described above may be selectively combined for configuration. The legitimate technical scope of the present disclosure should be determined by the technical idea that is defined in the following claims.

What is claimed is:

1. A roof cover for mounting an autonomous driving sensor, the roof cover comprising:

a base cover portion mountable to a vehicle roof, the base cover portion being divided into a plurality of mounting regions;

a first cover portion coupled to the mounting regions such that mounting positions of a plurality of radio detection and ranging (RADAR) sensor module and a first camera module are fixable to a front surface of the vehicle roof; and a second cover portion coupled to the first cover portion such that mounting positions of a light detection and ranging (LIDAR) sensor module and an antenna module are fixable to an upper surface of the vehicle roof;

wherein the first cover portion comprises:

a mounting bracket mountable in an upright position to the mounting regions to cover a widthwise direction of the mounting regions and in such a manner that the plurality of the RADAR sensor modules and the first camera module are mounted; and a first cover member covering a first detection region on a front surface of the mounting bracket to which the first camera module is mounted, wherein the first cover member together with a second side of the second cover portion defines a stepped structure and is coupled to the front surface of the mounting bracket.

2. The roof cover of claim 1, wherein the first cover portion further comprises:

a second cover member covering a second detection region on the front surface of the mounting bracket to which the plurality of the RADAR sensor modules are mounted.

3. The roof cover of claim 2, wherein the second cover member comprises a pair of sub-portion members having a same shape, and wherein, on the front surface of the mounting bracket, the pair of sub-portion members covers the second detection region except for the plurality of the RADAR sensor module exposed to the outside.

4. The roof cover of claim 2, wherein the second cover member comprises a plurality of clip members fixedly positioned to be hooked into the front surface of the mounting bracket by being inserted thereinto.

5. The roof cover of claim 2, wherein the second cover member together with a second side of the second cover portion defines a stepped structure and is coupled to the front surface of the mounting bracket.

6. The roof cover of claim 1, wherein the mounting bracket comprises:

a plurality of fastening holes aligned with a plurality of coupling holes in the plurality of RADAR sensor modules; and a plurality of hook coupling holes disposed so that hook members on the plurality of RADAR sensor modules are engaged therein.

7. The roof cover of claim 6, wherein the plurality of RADAR sensor modules are disposed on the front surface of the mounting bracket.

8. The roof cover of claim 1, wherein the mounting bracket comprises:

a plurality of guide pins disposed to enable a mounting bracket of the first camera module to be placed thereon; and a plurality of fastening holes disposed to enable fastening members of the mounting bracket of the first camera module to be fastened thereinto.

9. The roof cover of claim 8, wherein the first camera module is disposed on a rear surface of the mounting bracket.

10. The roof cover of claim 1, wherein the first cover member comprises a pair of sub-portion members having a same shape, and wherein, on the front surface of the mounting bracket, the pair of sub-portion members covers the first detection region except for a plurality of cameras exposed to the outside.

11. The roof cover of claim 1, wherein the first cover member comprises a plurality of hook members fixedly positioned to be hooked into the front surface of the mounting bracket by being inserted thereinto.

12. The roof cover of claim 1, wherein the second cover portion comprises:

a mounting guide disposed such that the antenna module is mounted;

a first coupling cover member having a mounting hole through a center thereof, wherein the LIDAR sensor module, coupled to the first cover portion and mounted by a bracket, passes through the mounting hole to protrude therefrom; and a second coupling cover member shielding an upper surface of the vehicle roof between the mounting guide and the first coupling cover member.

13. The roof cover of claim 12, wherein the first coupling cover member comprises:

a plurality of fastening holes for coupling to the first cover portion; and a cap member having a same height as the first coupling cover member and shielding an inside of one of the fastening holes in a state in which a fastening member is insertion-fastened into the one of the fastening holes by passing through a center thereof.

14. The roof cover of claim 1, further comprising third cover portions mounted on both sides of the base cover portion, respectively, wherein each of the third cover portions is configured to fix a mounting position of a second camera module to a lateral surface of the vehicle roof.

15. The roof cover of claim 14, wherein each of the third cover portions comprises:

a main body disposed such that a mounting bracket of the second camera module is placed thereinside; and a fixation member coupled to the vehicle roof to fix a position of the main body.

16. A vehicle comprising:

a vehicle body comprising a vehicle roof;

a plurality of autonomous driving sensors coupled to the vehicle body; and a roof cover comprising:

a base cover portion mounted to the vehicle roof, the base cover portion being divided into a plurality of mounting regions;

a first cover portion coupled to the mounting regions such that mounting positions of a plurality of radio detection and ranging (RADAR) sensor modules and a first camera module are fixed to a front surface of the vehicle roof; and a second cover portion coupled to the first cover portion such that mounting positions of a light detection and ranging (LIDAR) sensor module and an antenna module are fixed to an upper surface of the vehicle roof;

wherein the first cover portion comprises:

a mounting bracket mounted in an upright position to the mounting regions to cover a widthwise direction of the mounting regions and in such a manner that the plurality of RADAR sensor modules and the first camera module are mounted; and a first cover member covering a first detection region on a front surface of the mounting bracket to which the first camera module is mounted, wherein the first cover member together with a second side of the second cover portion defines a stepped structure and is coupled to the front surface of the mounting bracket.

17. The vehicle of claim 16, wherein the first cover portion further comprises:

a second member covering a second detection region on the front surface of the mounting bracket to which the plurality of the RADAR sensor modules are mounted.

18. The vehicle of claim 16, wherein:

the mounting bracket comprises:

a plurality of fastening holes aligned with a plurality of coupling holes in the plurality of RADAR sensor modules; and a plurality of hook coupling holes disposed so that hook members on the plurality of RADAR sensor modules are engaged therein; and the plurality of RADAR sensor modules are disposed on the front surface of the mounting bracket.

19. The vehicle of claim 16, wherein:

the mounting bracket comprises:

a plurality of guide pins disposed to enable a mounting bracket of the first camera module to be placed thereon; and a plurality of fastening holes disposed to enable fastening members of the mounting bracket of the first camera module to be fastened thereinto; and the first camera module is disposed on a rear surface of the mounting bracket.

20. A roof cover for mounting an autonomous driving sensor, the roof cover comprising:

a base cover portion mountable to a vehicle roof, the base cover portion being divided into a plurality of mounting regions;

a first cover portion coupled to the mounting regions such that mounting positions of a plurality of radio detection and ranging (RADAR) sensor modules and a first camera module are fixable to a front surface of the vehicle roof; and a second cover portion coupled to the first cover portion such that mounting positions of a light detection and ranging (LIDAR) sensor module and an antenna module are fixable to an upper surface of the vehicle roof;

wherein the first cover portion comprises:

a mounting bracket mountable in an upright position to the mounting regions to cover a widthwise direction of the mounting regions and in such a manner that the plurality of RADAR sensor modules and the first camera module are mounted;

a first cover member covering a first detection region on a front surface of the mounting bracket to which the first camera module is mounted, wherein the first cover member together with a second side of the second cover portion defines a stepped structure and is coupled to the front surface of the mounting bracket; and wherein the mounting bracket includes a plurality of guide pins disposed at predetermined positions.

* * * * *